United States Patent
Baudisch et al.

[11] Patent Number: 5,855,094
[45] Date of Patent: Jan. 5, 1999

[54] MOTOR VEHICLE DOOR

[75] Inventors: Andraes Baudisch, Eschbork; Manfred Mattutat, Ladenburg; Peter Diehl; Gunther Heim, both of Rodgau, all of Germany

[73] Assignee: YMOS Aktiengesellschaft-Industrieprodukte, Obertshausen, Germany

[21] Appl. No.: 689,625

[22] Filed: Aug. 9, 1996

Related U.S. Application Data

[63] Continuation of Ser. No. 639,097, Apr. 24, 1996, abandoned.

[30] Foreign Application Priority Data

Apr. 24, 1995 [DE] Germany ............... 195 14 964.5

[51] Int. Cl.$^6$ ............... E05D 5/14; B60J 5/04
[52] U.S. Cl. ............... 49/502; 49/348
[58] Field of Search ............... 49/348, 501, 502; 296/164.1, 146.2, 146.3, 146.4, 146.5, 146.6, 146.7

[56] References Cited

U.S. PATENT DOCUMENTS

| | | | |
|---|---|---|---|
| 4,529,244 | 7/1985 | Zaydel ............... | 296/146.5 |
| 4,651,470 | 3/1987 | Imura et al. ............... | 49/502 |
| 4,845,894 | 7/1989 | Herringshaw et al. ............... | 296/146.5 |
| 4,866,883 | 9/1989 | Brown et al. ............... | 49/348 |
| 4,882,842 | 11/1989 | Basson et al. ............... | 296/146.5 |
| 4,907,836 | 3/1990 | Ueda et al. ............... | 49/502 |
| 5,111,619 | 5/1992 | Billin et al. ............... | 49/502 |
| 5,169,204 | 12/1992 | Kelman ............... | 49/502 |
| 5,355,629 | 10/1994 | Kimura et al. ............... | 49/502 |
| 5,419,606 | 5/1995 | Hull et al. ............... | 296/146.7 |
| 5,603,548 | 2/1997 | Gandhi et al. ............... | 49/502 |

FOREIGN PATENT DOCUMENTS

| | | |
|---|---|---|
| 0 208 188 | 1/1987 | European Pat. Off. . |
| 0 424 760 | 10/1990 | European Pat. Off. . |
| 3613978 | 9/1987 | Germany . |
| 6-255364 | 3/1993 | Japan . |

*Primary Examiner*—Blair M. Johnson
*Assistant Examiner*—Curtis Cohen
*Attorney, Agent, or Firm*—Venable; George H. Spencer; Norman N. Kunitz

[57] ABSTRACT

A motor vehicle door having a basic body (2; 22) and respectively an inside and an outside panel (4, 3; 23, 21; 27, 26), wherein the window-side circumferential edge (9) of the outside panel (3; 21; 26) is provided at least partially with an undercut (10) engaged by the corresponding regions of the circumferential edge of the basic body (2) or the inside panel (4), and wherein the outside panel (3) is provided with a folded section (16) at least at the end (15) of the circumferential edge (8) disposed opposite the window-side circumferential edge. To accomplish easy, quick and cost-advantageous mounting or replacement of the outside panel, the basic body (2; 22) or the inside panel (4; 23; 27) is connected by way of fastening means (18; 24; 28) to the wall region (20) of the folded section (14) of the outside panel (3; 21; 26), which wall region faces the door sill (14) of the corresponding motor vehicle. Clips, expanding rivets, screws, Velcro connections, foam adhesives, snap hooks, securing hooks, snap hinges, detent hooks, etc. may be used as the fastening means.

4 Claims, 4 Drawing Sheets

MOTOR VEHICLE DOOR

REFERENCE TO RELATED APPLICATIONS

This application is a continuation of application Ser. No. 08/639,097, filed Apr. 24, 1996, now abandoned and claims the priority of German application Serial No. DE 19514964.5, filed Apr. 24, 1995, which are incorporated herein by reference.

BACKGROUND OF THE INVENTION

The invention relates to a motor vehicle door having an inside and an outside panel wherein the window-side circumferential edge of the outside panel is provided at least partially with an undercut engaged by the corresponding regions of the circumferential edge of the basic door body or the inside panel, and wherein the outside panel is provided with a folded section at least at the end of the circumferential edge disposed opposite of the window-side circumferential edge.

Such a motor vehicle door is known, for example, from EP 0 424 760 A2. To ensure easy mounting or replacement of the outside panel (door leaf), the panel is provided on at least one side of its circumferential edge with an undercut with which it is slid onto or threaded (inserted) into the window-side circumferential region of the basic body or of the inside panel. The sides of the door leaf as well as of the corresponding edge region of the basic body or of the inside panel which are respectively opposite the first undercut are provided with groove-shaped recesses facing one another, which recesses are engaged by a tough and elastic profiled strip which connects and seals the recesses.

The biggest drawback of this known motor vehicle door is the complexity connected with the insertion of the elastic profiled strip because, on the one hand, this process is relatively time-consuming and, on the other hand, it requires specialized additional assembly devices.

It is the object of the invention to provide a motor vehicle door of the type specified at the outset, wherein the panels can be mounted or replaced easily, quickly and cost-advantageously.

SUMMARY OF THE INVENTION

The above object generally is achieved according to the invention by a motor vehicle door of the type initially described above wherein the basic door body or the inside panel is connected via fastening means to the wall region of the folded section of the outside panel, which wall region faces the door sill of the corresponding motor vehicle. Further, particularly advantageous embodiments and modifications of the invention are disclosed and claimed.

Starting from EP 0 424 760 A2 mentioned at the outset, the invention is essentially based on the concept of connecting the basic door body or the inside panel by way of clips, expanding or spreading rivets, screws, hook and loop-type fasteners sold for example, under the trademark Velcro connections, a foam adhesive, snap hooks, securing hooks, snap hinges, detent hooks, etc. to the wall region of the inwardly folded section or part of the outside panel, which wall region faces the door sill of the corresponding motor vehicle. In contrast to the above-mentioned prior art motor vehicle door, it is therefore not necessary to create an additional groove-shaped recess in the basic body or in the inside panel.

For the mounting of the door leaf, the leaf is first threaded or inserted into the window-side edge regions of the basic body or of the inside panel, and then swung downward, similar to the insertion arrangement in EP 0 424 760 A2. However, different from EP 0 424 760 A2, this is not followed by the insertion of a profiled strip made of tough and elastic material into corresponding grooves of the door leaf and of the basic body or of the inside panel. Rather, the door leaf and the basic body or the inside panel are connected with one another by means of the above-mentioned simple and conventional fastening means.

In one embodiment of the invention, it proved worthwhile to use a slide-in core (profiled rail) instead of the above-mentioned fastening means. In this case, the profiled rail does not engage the oppositely disposed groove-shaped recesses of the door leaf and of the basic body or the inside panel, in contrast to the subject matter of EP 0 424 760 A2. Instead, the edge of the folded section of the door leaf facing the basic body or the inner panel extends through corresponding recesses in the edge of the basic door body or the inside panel, and is fixed in this position by the profiled rail.

BRIEF DESCRIPTION OF THE DRAWINGS

Further details and advantages of the invention ensue from the embodiments which follow and which are explained by way of figures. The figures show.

DETAILED DESCRIPTION OF THE PREFERRED EMBODIMENTS

Figure 1:
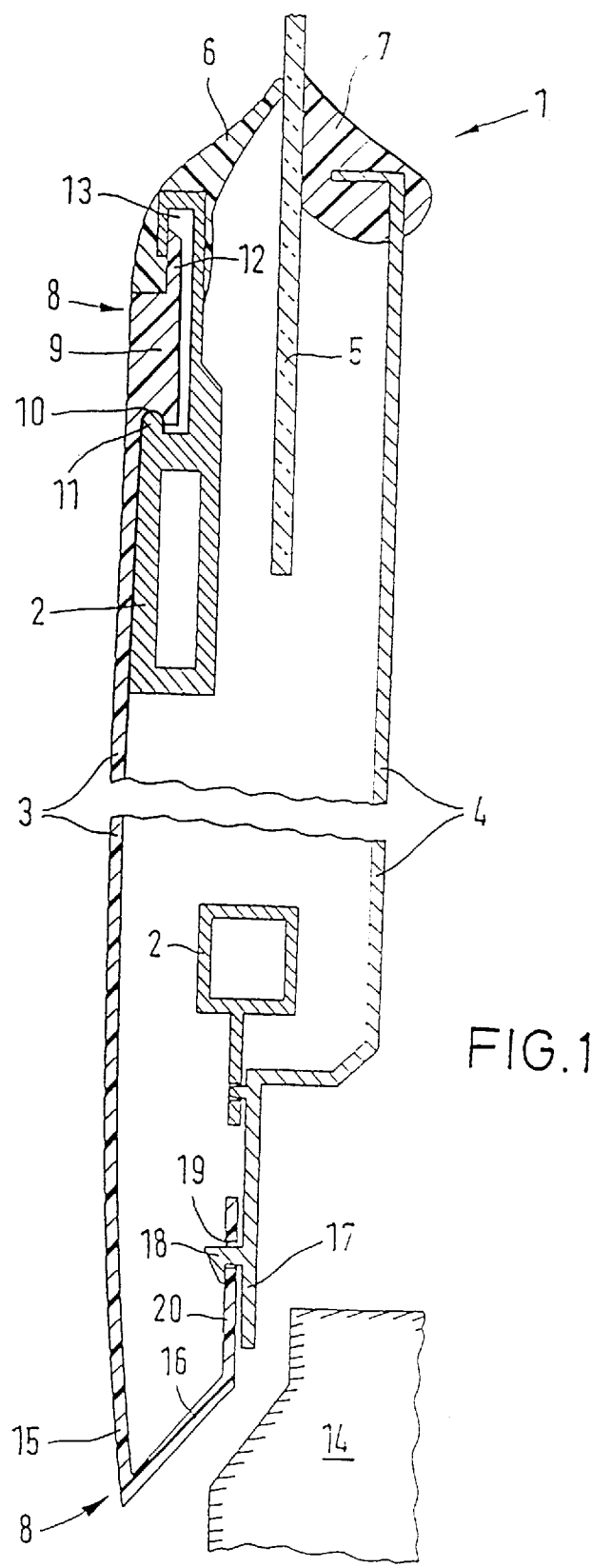
FIG. 1 is a schematic cross section through a motor vehicle door having a detent connection between the door leaf and the inside panel in the lower door region according to an embodiment of the invention.

In FIG. 1, a motor vehicle door is identified by 1, which door is essentially comprised of an only partially shown basic door body 2, e.g., an aluminum section, an outside panel (door leaf) 3, e.g., made of plastics, an inside panel 4 facing the passenger compartment of the motor vehicle, and a window 5. Rubber seals 6, 7 are provided for the sealing of the window 5 in a conventional manner.

The circumferential edge 8 of the door leaf 3 is provided with an undercut 10 on its window-side (upper) end 9, which undercut is engaged by a hook-shaped wall section 11 of the basic body 2. Moreover, at the upper end 9, the circumferential edge 8 has a web-shaped or rib-shaped extension 12 which engages a U-shaped undercut 13 of the basic door body 2.

At its lower end 15 facing the door sill 14 of the motor vehicle, the circumferential edge 8 of the door leaf 3 has a folded section 16. In this region, the door leaf or outer panel 3 and the inside panel 4 are connected with one another, with several hook-shaped plunger or detent pins 18, which are arranged in the lower region 17 of the inside panel 4, which project through corresponding openings 19 of the wall region 20 of the folded section 16 facing the door sill 14, and which extend behind the wall section 20 to lock or attach the panels 3 and 4 together.

For the mounting of the door leaf 3, the leaf 3 is first threaded or inserted into the corresponding recess of the basic door body 2 at the upper end of the door leaf 3. Then the door leaf 3 is swung toward the motor vehicle door 1 until the plunger pins 18 have been pressed through the openings 19 and extend behind the wall region 20. The entire assembly can take place extremely quickly without the need for any specialized tools.

Figure 2:
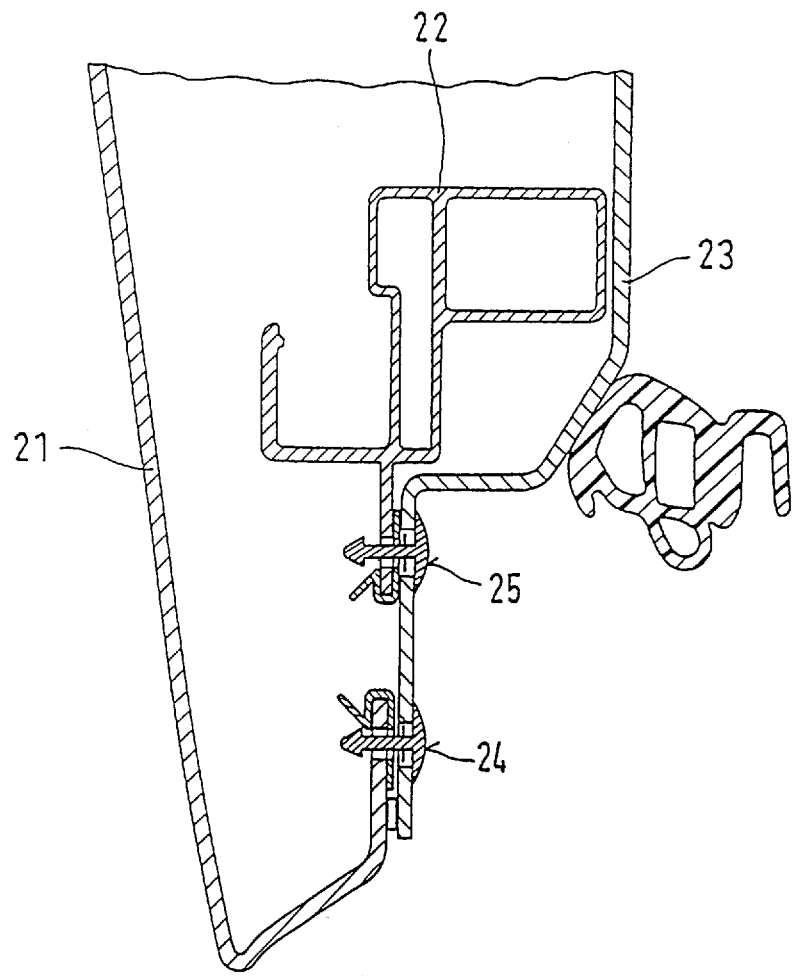
FIG. 2 is a schematic partial cross section showing another embodiment of a vehicle door according to the invention having a clip-type connection between the door leaf and the inside panel.

FIG. 2 shows a further embodiment of a detent connection of a door leaf with the basic body of a motor vehicle door. Here, the door leaf is identified by the reference numeral 21, the basic body by numeral 22, and the inside panel by numeral 23. In this case, the inside panel 23 is connected to the door leaf 21 by means of clip-type connecting elements 24. The inside panel 23 is again connected to the basic body 22 via corresponding suitable connecting elements 25.

Figure 4:
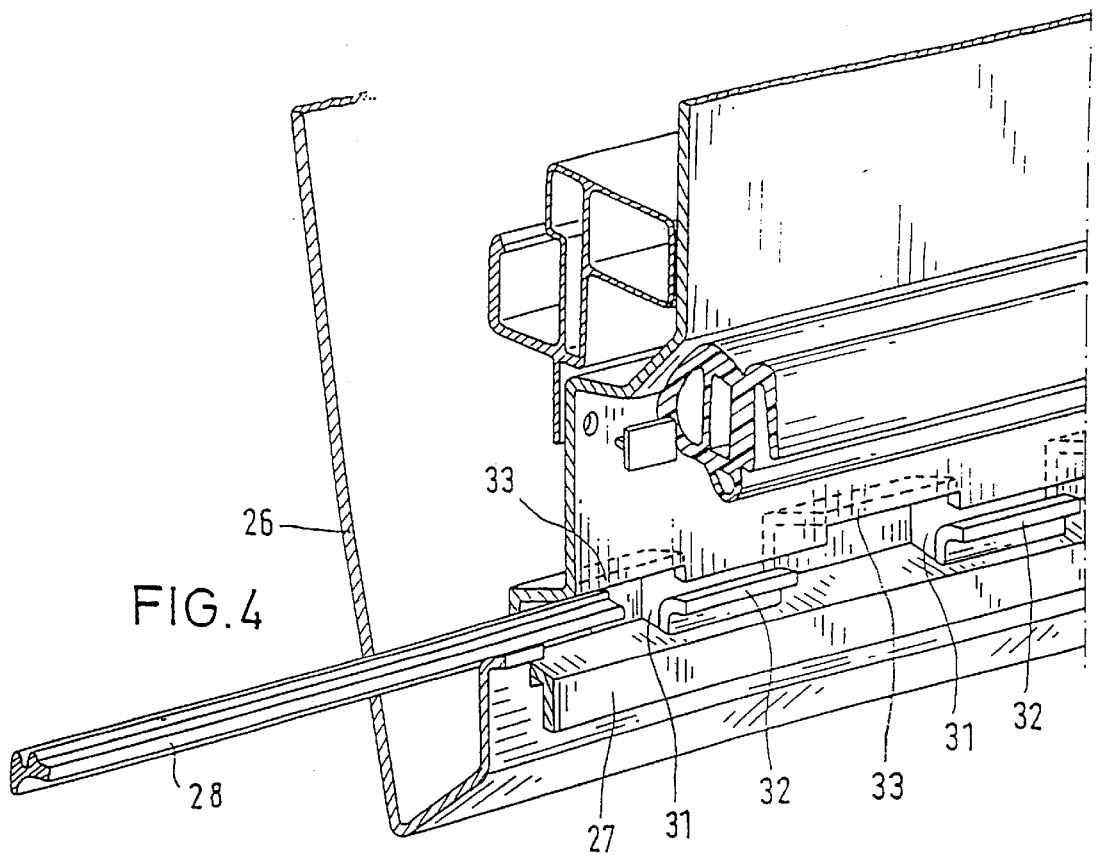
FIG. 4 is a perspective view of the embodiment shown in FIG. 3.
Figure 3:
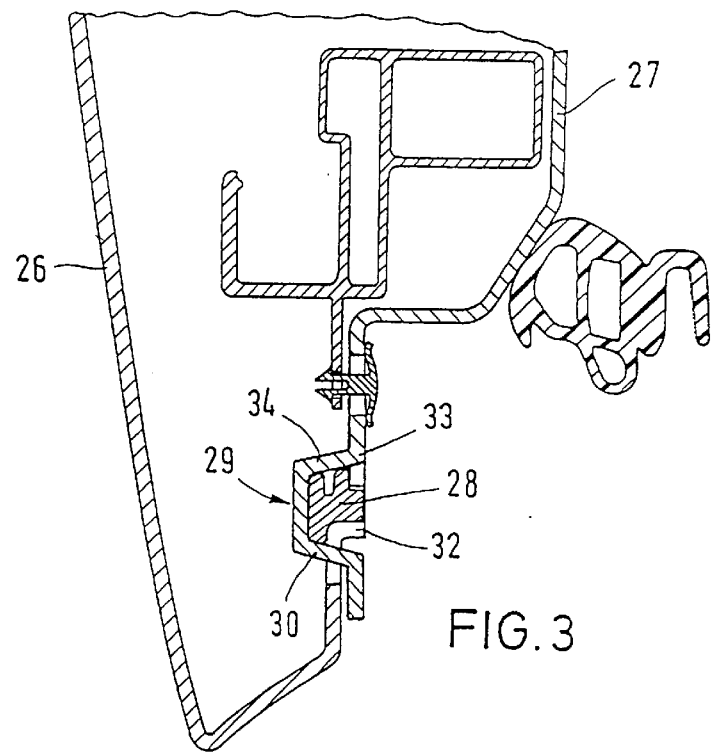
FIG. 3 is a schematic partial cross section showing still a further embodiment of a vehicle door according to the invention having a connection between door leaf and the inside panel using a slide-in core.

FIGS. 3 and 4 show an embodiment of the invention in which the door leaf or outside panel 26 is connected to the inside panel 27 via a metallic slide-in core (profiled rail) 28. For this purpose, the inside panel 27 has a shaped section or part 29 on the panel's side facing the door leaf 26, with this shaped section being provided with a plurality of recesses 31 at predetermined spacings in the lower wall region 30 (FIG. 4). The lower edge of the door leaf 26 is provided with tongues or projections 32 which project or extend into and through the recesses 31, with the outer edges of the projections 32 being bent toward the door sill, not shown, in this region. The door leaf 26 and the inside panel 27 are fixed in place by sliding the profiled rail 28 into the shaped section 29. During this process, the profiled rail 28 is supported against the web-shaped support elements 33 formed by the upper wall region 34 of the shaped section 29 containing the recesses 31.

Of course, the invention is not limited to the above-described embodiments. Depending on the design of the motor vehicle door, the edge-side fastening of the door leaf can also be effected only at the basic body or only at the inside panel.

Figure 5:
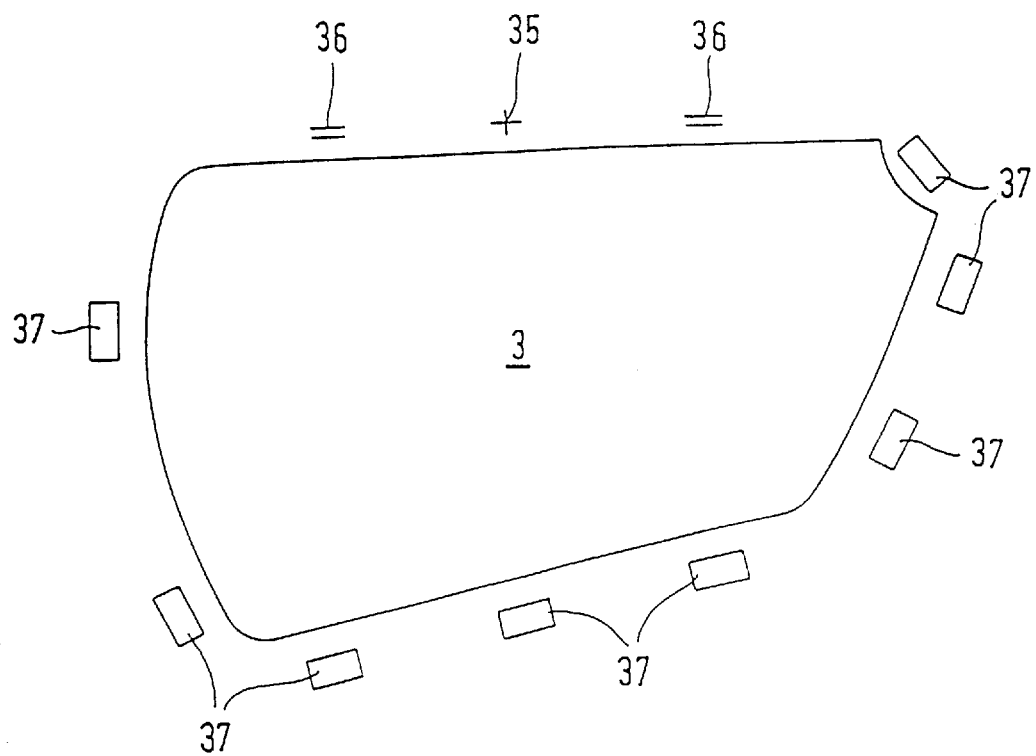
FIG. 5 shows a plan view of a schematically represented door leaf having additional fastening elements.

In order to allow compensating movements of the panels with respect to one another and with respect to the basic body (e.g., to take account of heat expansion), corresponding tolerances must be taken into account for the undercuts and for the additional fastening means (e.g., screw connection, etc.). A corresponding embodiment is shown in FIG. 5. Here, reference numeral 3 again identifies the door leaf which is disposed in the position shown in FIG. 1, i.e., swung or pivoted in and latched. Reference numeral 35 identifies a form-fitting fastening means, e.g., a drive-in wedge, which acts as a fixed bearing in all three directions. The fastening means identified by 36, which represent the rail formed by the upper end of the basic body 2, allow a displacement of the door leaf 3 in the horizontal direction (x-axis) and, in this direction, they therefore act as a sliding bearing. But in the directions perpendicular to this horizontal direction (y-axis and z-axis), the fastening means 36 act as fixed bearings. The fastening means identified by 37 are selected such that they act as sliding bearings in the direction of the x-axis and z-axis and as fixed bearings in the direction of the y-axis.

The fastening principle shown in FIG. 3 (bearing principle) has several advantages: On the one hand, there exists a tolerance compensation with respect to the door joint 3. On the other hand, the door leaf 3 does not bulge because heat expansion can be compensated in a stress free manner. Finally, an impact, e.g., in the event of a falling rock, is mitigated by the damping properties in the sliding seat.

The invention now being fully described, it will be apparent to one of ordinary skill in the art that any changes and modifications can be made thereto without departing from the spirit or scope of the invention as set forth herein.

What is claimed:

1. A motor vehicle door having a basic door body, an inside panel and an outside panel, and wherein: a window-side circumferential edge of the outside panel is provided at least partially with an undercut engaged by a corresponding region of a circumferential edge of the basic door body; the outside panel is provided with an inwardly folded section at least at an end of its circumferential edge disposed opposite of the window-side circumferential edge; and, the inside panel is directly connected to a wall region of the folded section of the outside panel, which wall region will face a door sill of an associated motor vehicle, via a hook fastener which is mounted on and integral with said inside panel and which extends only through an opening in said wall region.

2. A motor vehicle door according to claim 1, wherein the wall region of said inwardly folded section extends substantially upwardly and adjacent an inner surface of said inner panel.

3. A motor vehicle door having a basic door body, an inside panel and an outside panel, and wherein: a window-side circumferential edge of the outside panel is provided at least partially with an undercut engaged by a corresponding region of a circumferential edge of the basic door body; the outside panel is provided with an inwardly folded section at least at an end of its circumferential edge disposed opposite of the window-side circumferential edge; said inside panel is connected via fastening means to a wall region of the folded section of the outside panel, which wall region will face a door sill of an associated motor vehicle; said inside panel is provided with a shaped section in a region adjacent said wall region of said folded section, which shaped section extends toward said wall region of said outside panel, and with said shaped section being provided with recesses at predetermined spacings; said wall region of said folded section of said outside panel includes a plurality of bent edge regions which extend into said recesses; and the fastening means for fastening the outside panel to said inside panel is a slide-in core which extends into said shaped section so as to push said outside panel in said region of said recesses toward the interior compartment of the motor vehicle, and so as to be supported during this connecting process against said inside panel by corresponding web-shaped support elements of said shaped portion.

4. A motor vehicle door having a basic door body, an inside panel and an outside panel, and wherein: a window-side circumferential edge of the outside panel is provided at least partially with an undercut engaged by a corresponding region of a circumferential edge of the basic door body; the outside panel is provided with an inwardly folded section at least at an end of its circumferential edge disposed opposite of the window-side circumferential edge; one of the basic door body and the inside panel is connected via fastening means to a wall region of the folded section of the outside panel, which wall region will face a door sill of an associated motor vehicle; one of said basic door body and said inside panel is provided with a shaped section in a region adjacent said wall region of said folded section, which shaped section extends toward said wall region of said outside panel, and with said shaped section being provided with recesses at predetermined spacings; said wall region of said folded section of said outside panel includes a plurality of bent edge regions which extend into said recesses; and the fastening means for fastening the outside panel to one of said basic door body and said inside panel is a slide-in core which extends into said shaped section so as to push said outside panel in said region of said recesses toward an interior compartment of a motor vehicle, and so as to be supported during this connecting process against one of said basic door body and said inside panel by corresponding web-shaped support elements of said shaped portion.

* * * * *